United States Patent [19]
Weppner

[11] Patent Number: 5,202,788
[45] Date of Patent: Apr. 13, 1993

[54] ELECTROCHROMIC DEVICE WITH IONICALLY OR MIXED IONICALLY-ELECTRONICALLY CONDUCTIVE ELECTROLYTE

[75] Inventor: Werner Weppner, Stuttgart, Fed. Rep. of Germany

[73] Assignee: Max-Planck-Gesellschaft zur Forderung der Wissenschaften e.V., Gottingen, Fed. Rep. of Germany

[21] Appl. No.: 740,773

[22] Filed: Aug. 6, 1991

[30] Foreign Application Priority Data

Aug. 7, 1990 [DE] Fed. Rep. of Germany ....... 4025032

[51] Int. Cl.$^5$ ............................................. G02F 1/01
[52] U.S. Cl. .................... 359/270; 359/265; 359/269; 359/273
[58] Field of Search .............. 359/269, 267, 270, 273; 429/202, 193, 213

[56] References Cited

U.S. PATENT DOCUMENTS

| | | | |
|---|---|---|---|
| 3,652,149 | 3/1972 | Rogers | 350/160 |
| 3,712,710 | 1/1973 | Castellion et al. | 359/267 |
| 4,298,259 | 11/1981 | Boyd et al. | 350/357 |
| 4,443,115 | 3/1984 | Kaneko et al. | 359/267 |
| 4,731,311 | 3/1988 | Suzuki et al. | 429/213 |
| 4,878,743 | 11/1989 | Aikawa et al. | 359/267 |
| 4,906,075 | 3/1990 | Matsumiya | 359/267 |
| 4,940,315 | 7/1990 | Demiryont | 359/267 |

FOREIGN PATENT DOCUMENTS

0323007 7/1989 European Pat. Off. .
2079483 1/1982 United Kingdom .

OTHER PUBLICATIONS

Applied Physics Letters, 55 (1989) No. 21, Nov. 20, 1989, *Electrolyte-Free Electrochromic Device.*

*Primary Examiner*—Rolf Hille
*Assistant Examiner*—Mahshid Saadat
*Attorney, Agent, or Firm*—Nikaido, Marmelstein, Murray & Oram

[57] ABSTRACT

The present invention provides an electrochromic device which is especially suitable as a window, mirror or display element, characterized by a multi-layer construction with at least one layer, enclosed between two coated electrodes, of a material which is either ionically- or mixed ionically- and electronically-conductive, whereby at least one of the two electrode layers consists of transparent material and the ionically- or ionically- and electronically-conductive material is at least so long transparent as no excitation takes place by the application of voltage via the electrodes.

17 Claims, 2 Drawing Sheets

Fig.3
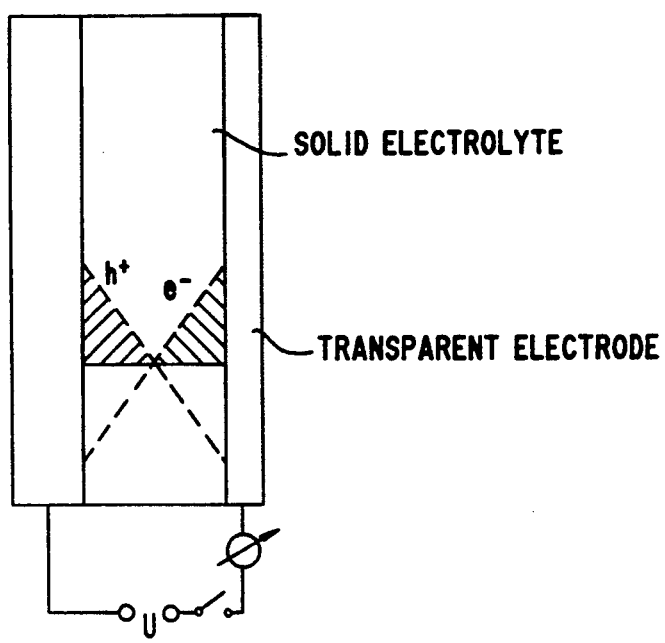
Fig.4
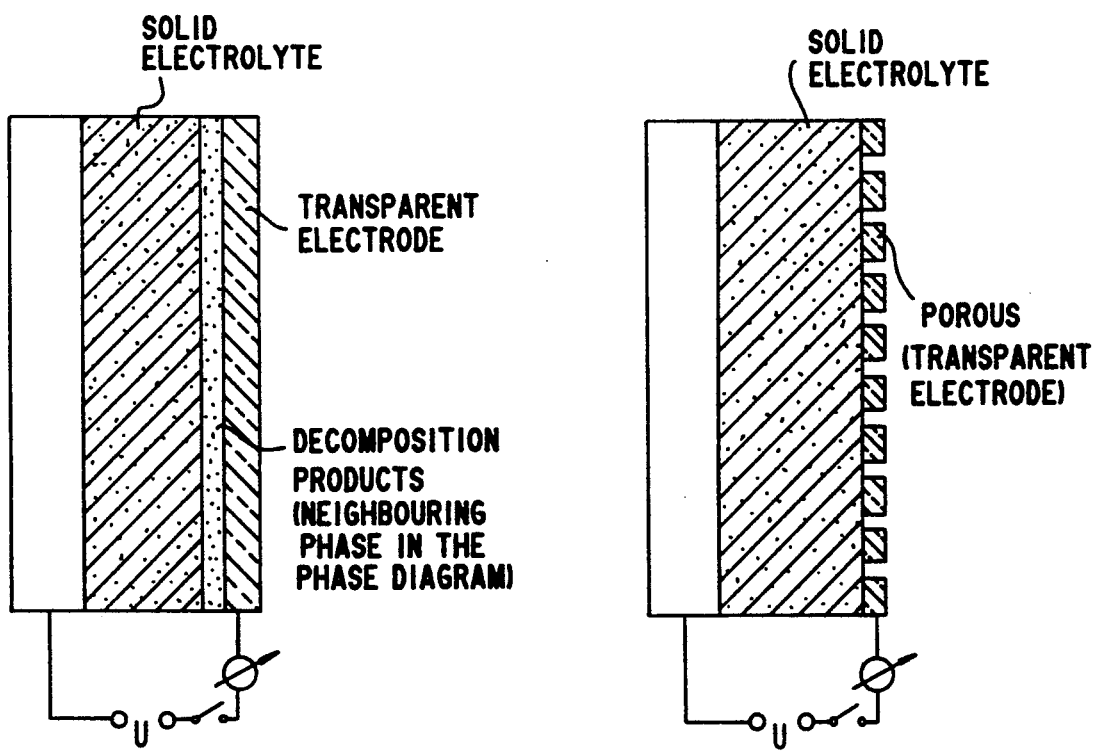
Fig.5

ELECTROCHROMIC DEVICE WITH IONICALLY OR MIXED IONICALLY-ELECTRONICALLY CONDUCTIVE ELECTROLYTE

The present invention is concerned with an electrochromic device which is especially useful as a window, mirror or display element, as well as with the use thereof as a radiation and heat protective window, variable mirror and display.

Electrochromic layers in windows serve to influence the light behaviour, the colour design and the reduction of the heat conductivity (energy conservation not only in rooms to be heated but also in rooms to be cooled) in buildings, automobiles and the like. Electrochromic layers are also used in mirrors, use thereby being made of the absorption of the light beam by the electrochromic element before reaching the reflecting surface. Furthermore, electrochromic layers are also of interest as display elements, for example in clocks and watches, on indicator boards and for flat display screens. The advantages of such electrochromic layers in comparison with light diodes and liquid crystals are particularly the small energy requirement and the thermal stability, the unlimited optical angle and the unnecessary plane parallelism of the electrodes.

Previously known electrochromic systems depend upon the production of galvanic cells which consist of anode/electrolyte/cathode and, in addition, the transparent lead-off electrodes. The electrolyte is hereby mostly liquid but systems with solid electrolytes have also been described. Not only the anodes but also the cathodes are generally electrochromically active, i.e. they become coloured with the take-up or giving off of ions. In the preponderant number of cases, tungsten trioxide ($WO_3$) is used as cathode which, by an incorporation reaction of M (=hydrogen, lithium, sodium and the like), forms a dark blue bronze $M_xWO_3$ ($x \geq 0.3$) (see FIG. 1 of the accompanying drawings).

The electrochemically-active ions required for the coloration are taken from the anode (counter-electrode). They thereby change their electron concentration in an equivalent way. In the case of electrochromic mirrors, the colour of the counter-electrode plays no part since they are present behind the reflecting surface. However, in the case of windows it is necessary that both electrodes are simultaneously optically transparent and, in the electrochromic state, at least one of the electrodes is coloured. Tin-doped indium oxide ($In_2O_3$) is usually employed for electronically conducting and transparent lead-offs.

In the case of electrochromic systems of the prior art, in each charged and discharged state of the galvanic cell, at least the 5 phases (lead-off electrode/anode/electrolyte/cathode/lead-off electrode) must be stable with one another. In principle, a kinetic stability suffices. However, because of the required high mobility of the ions, a great tendency exists to take up a thermodynamic equilibrium. The reaction must be reversible and thermodynamic equilibria are to be aimed for according to these considerations.

The material requirements for the described prior art are extremely high, for which reason it is not surprising that hitherto no practically useable systems are commercially available. Electrochromic outer mirrors with liquid electrlytes have hitherto been the most widely developed, these having no particular requirements with regard to the counter-electrode. However, at low temperatures, the liquid electrolyte is no longer sufficiently conductive in order to be able to achieve a coloration in an acceptable period of time.

Therefore, it is an object of the present invention to overcome the difficulties and disadvantages shown by the prior art and to make available practically useable electrochromic systems.

Thus, according to the present invention, there is provided an electrochromic device which is especially suitable as window, mirror of display element, which is characterised by a multilayer construction with at least one layer enclosed between two coated electrodes, this layer being either an ionically- or mixed ionically- and electronically-conductive material, at least one of the two electrode layers consisting of transparent material and the ionically- or ionically- and electronically-conductive material is at least so long transparent as no excitation takes place by the application of voltage via the electrodes.

The device according to the present invention displays a substantially simplified construction in comparison with the electrochromic systems described in the prior art. Instead of the three phases of the electrochemical cell (anode/electrolyte/cathode), only a single electrochromically active phase is used which is still only in contact with the lead-off electrodes. The problem of the stability thus disappears and the construction is simpler and more cost-favourable to produce. The problem of the simultaneous colouring and decolouring of the counter-electrode also disappears. The single electrochromically active layer is either only initially coloured on one side or the colouring forms on both sides in a mutually assisting way. According to the invention, it is hereby possible that, after the application and removal of a voltage, the coloration of the ionically- or ionically- and electronically-conducting layer is still maintained for some time, independent of the material used. Especially in the case of the use of a preponderantly ionically-conducting material, after the coloration there exists a difference of the activity of the electro-active components on both sides, which manifests itself by a cell voltage. In this case, even without the externally applied voltage, the coloration remains so long as the electromotive force (EMF) exists.

A further advantage of the device according to the present invention is the fact that the ions no longer have to traverse a phase boundary from one of the phases to the other one since, in general, such an occurrence is very strongly kinetically hindered.

Preferred embodiments of the present invention are described in the subsidiary claims.

According to the present invention, the construction illustrated in FIG. 2a of the accompanying drawings is used for an electrochromic element not only for transmission but also for reflection. The electrochromically active layer of conducting material present in the middle is enclosed between two preponderantly electronically conducting coated electrodes. Depending upon the conditions of use, the two electrodes are hereby transparent (for example in the case of windows or possibly also of displays; see FIG. 2a) or one of the layers is permanently reflecting or coloured (mirrors or possibly display elements, flat display screens; see FIG. 2b).

In the device according to the present invention, the transparent electrode material is, for example, $Sn_2O_3$-doped indium oxide.

In the case of reflection (mirrors, display elements, display screens), because of the preponderant electronic conductivity of optically reflective or coloured materials, there are given almost unlimited possibilities for the choice of suitable electrodes.

In the uncoloured state of the electrochromic layer of conducting material, the reflective plane or the coloration is visible. By coloration (darkening) of the middle conducting layer, the colour of the rear electrode can then be darkened or completely covered over.

The conducting material of the electrochromic layer can be either ionically-conducting material or mixed ionically- and electronically-conducting material. Examples of purely ionically-conducting materials include zirconium dioxide (+yttrium oxide) and examples of mixed electronically- and ionically-conducting materials include titanium dioxide (+iron). In published Federal Republic of Germany Patent Specification DE-A 35 03 264, it was shown that, by the application of voltage to mixed (not only ionic but also preponderantly electronic) conducting solid bodies, the composition thereof can be locally changed. The result of this is that, in the interior of the material, pn transitions are introduced or oxygen atoms are removed or incorporated.

By means of the local variation of the stoichiometry of the preponderantly electronic conductor, the colour can also be changed. Starting from the originally homogeneous and transparent material, by the application of the voltage to the side of the negative polarity of the applied voltage, the excess electron concentration is increased or the defective electron concentration is reduced. On the other hand, on the side of the positive polarity, by means of the voltage the defective electron concentration is increased or the excess electron concentration is decreased. If the material is present in the original uncoloured state, i.e. on or near the intrinsic point with relatively low excess and defective electron concentration, then, by the applied voltage on both sides, the number of the (free) electronic conduction carriers absorbing the light is increased (not only excess but also defective electrons are responsible for the absorption of light). The layer becomes dark coloured. The number of the electronic conduction carriers present in the optical path has increased due to the applied voltage. By means of the switching off of the voltage, the excess and defective electrons present with locally differing concentrations again diffuse into one another. They thereby destroy themselves and the original uncoloured state with low integral total electron concentration is again produced. The procedure is reversible and can be repeated as desired.

In each state, the electrochromically active layer is present in the same phase, i.e. with the same crystal structure. Only the stoichiometry and thus the electronic structure change. This is shown in FIG. 3 of the accompanying drawings where the unbroken line shows the concentration distribution of the excess and defective electrons without applied voltage U (the values are here taken as being equal but can also be somewhat different). The broken lines show the concentration distribution with applied voltage for excess electrons $e^-$ and defective electrons $h^+$, the cross-hatched region indicating the concentration gain of the electronic conduction carriers due to the applied voltage U.

However, the local change of the composition can also comprise a breakdown of the layer not only on one but also on both sides (see FIG. 4 of the accompanying drawings). There are thereby also given colour changes in that another compound is formed with a different colour.

These phases formed by electrochemical breakdown are, according to the phase diagram, neighbouring phases which are thermodynamically stable with the starting layer. However, these phases are at least kinetically stable. Stability problems such as in the case of systems according to the prior art thereby do not arise. By switching off of the voltage, the neighbouring phases are again reformed and the arrangement again goes back into the original homogeneous state with a single phase.

In a preferred embodiment of the present invention, the layer of conductive material consists of tungsten trioxide, of titanium dioxide (rutile) doped with 0.1 to 2% iron or of zirconium dioxide with an addition of yttrium oxide. Further examples for preferred materials of the ionically- or ionically- and electronically-conducting layer include $Li_{2.3}Ti_{3.4}O_8$, $LiAl_5O_8$, $Li_5AlO_4$, $LiMnO_2$, $LiMnO_3$, $LiCoO_2$, $LiNiO_2$, $LiFeO_2$, $NaNiO_2$ and $NaCoO_2$.

In a further preferred embodiment of the present invention, one of the electrodes, namely the transparent electrode, is made porous or perforated.

Hitherto, the electrochromic material was regarded as being sealed in by the two lead-off electrodes. However, the middle electrochromically-active, conducting layer can also permit an exchange with the surroundings, for example with the surrounding air. Therefore, if one of the electrodes is made in porous form (see FIG. 5 of the accompanying drawings), then, by the application of the voltage, the concentration of one of the components standing in exchange with the surroundings is decreased or increased. An increase or decrease of this component in the layer takes place from the surroundings. For reasons of electron neutrality, with the incorporation or removal, the concentration of the electronic or ionic conduction carrier absorbing the light changes. A coloration (or possibly also decolorisation) takes place which can again be reversed by switching off the voltage. According to the present invention, the previously described arrangement can also be used with an electrode produced according to the initially described state of the art in addition to the middle layer. In this case, by the application of the voltage, there is again given a local change of the stoichiometry of the mixed conductor, whereby this can, however, be determined by the equilibrium with the electrode on this side. By means of the local change of the composition, the concentration of the electronic charge carrier, integral over the optical path, changes and thus the colour of the arrangement.

According to the present invention, there is possible not only the use of mixed, namely ionically- and electronically conducting materials, but also of preponderantly ion-conducting materials. The preponderantly electronic conducting of the active middle layer in the case of the use of a mixed conductor requires, for the maintenance of the voltage, i.e. of the coloration, a current flow and thus a not inconsiderable energy consumption. In the case of the use of an ion conductor, due to the applied voltage, there is given, according to Nerst's Law, a difference of the chemical potential of the neutral electrochromically active components. An electrochromic device consisting solely of a single phase, namely the ion conductor and the two electronic lead-offs, undergoes, due to the applied voltage, a reduction on one side and an oxidation on the other side.

On one side, the excess electron concentration is increased (or the defective electron concentration is decreased) and on the other side the defect electron concentration is increased (or the excess electron concentration is decreased). If the ion conductor is present in the initial stage, perhaps at the stoichiometric point (equal excess and defective electron concentration or minimum of the total electron concentration), then, due to the voltage, on both sides there is given an increase of the concentration of the electronic charge carrier and a coloration of the ion conductor occurs. The response time for the equilibrium depends upon the diffusion coefficients of the electrons which, as second fastest charge carrier, control the proceedure of the change of the local composition. In comparison with the previous electrochromic devices, it is advantageous that the ions no longer have to overcome a phase boundary. There apply, in order, the same possibilities of variation as have already been described above for mixed conductors. The electrode materials which have already been described for the mixed conductors can also be used.

The ion conductor can also exchange components with the surroundings. For example, the solid electrolyte zirconium dioxide ($+10$ mole % yttrium oxide) can exchange oxygen with the surroundings through a porous electrode. The surroundings thereby fix the equilibrium oxygen partial pressure on this electrode side. The applied voltage then determines, referred thereto, a difference of the chemical potential of the oxygen between the two electrodes. There results a change of stoichiometry with a change of the electron concentration which leads to the coloration. An advantage of the use of ion conductors in comparison with mixed conductors as electrochromically active material in the electrochromic device according to the present invention is the low energy requirement for the maintenance of the coloration. Since the electrodes are blocking for ions, in the case of an ion conductor, there flows stationarily only a very small residue current of the electronic minority charge carrier which is negligibly small in comparison with the use of mixed conductors. For the response or reaction time, in each case the diffusivities of the minorty charge carriers are decisive. These are the ions in the case of mixed conductors and the electrons in the case of preponderantly ionic conductors. The values are frequently of the same order of magnitude. However, there are numerous mixed conductors which display an extraordinarily rapid local change of the stoichiometry comparable with liquids or even gases (see published European Patent Specification EP-A 81 100 739.2).

In the case of the use of the electrochromic devices according to the present invention, there are usually applied voltages, freed with regard to polarisation phenomena, of from a few mV to 4 V.

The electrochromic device according to the present invention makes it possible, with a simply producable construction, to produce shadable windows, mirrors or display elements which, in comparison with previously known systems, are advantageous, whereby not only a lower current consumption, especially for devices with the use of an ion conductor, but also the material requirements herefore are of such a type that the systems can indeed be used practically.

Therefore, a further subject of the present invention is the use of an electrochromic device according to the present invention as radiation and/or heat protection window or as display element in which, to a device, the two electrodes of which are transparent, there is applied an electric voltage and a coloration of the layer of ionic- or ionic- and electronic-conducting material is thereby brought about. Also the subject of the present invention is the use of an electrochromic device, one electrode of which, namely on the side of the device facing away from the observer, is made of reflective material, as shadowed mirror, whereby, by means of the application of a voltage to the electrodes, a coloration of the layer of the ionically- or ionically- and electronically-conducting material is brought about. Yet of further subject of the present invention is the use of a device according to the present invention, in which the electrode lying on the side of the device facing away from the observer consists of a coloured non-transparent material, as display element, whereby, by application of a voltage, there is again brought about a coloration of the layer of conductive material and thus a covering over of the electrode colour.

The following Examples are given for the purpose of illustrating the present invention, reference thereby being made to the accompanying drawings in which FIG. 1 shows an electrochromic device according to the prior art;

FIG. 3 shows schematically the concentration distribution for excess and defective electrons with and without an applied voltage;

FIG. 4 shows a device, the electrochromic material of which forms decomposition products in the boundary area with the neighbouring phase; and FIG. 5 shows a preferred embodiment of the present invention in which one of the electrodes, namely the transparent one, is made porous.

EXAMPLE 1

Figure 1:
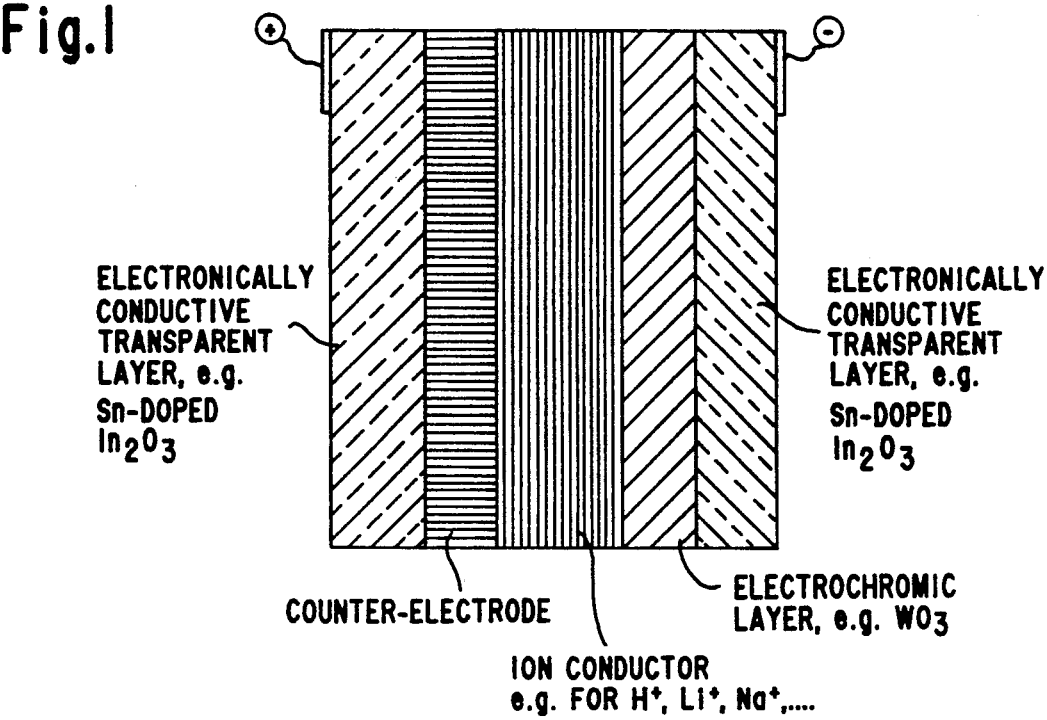
Figure 2A:
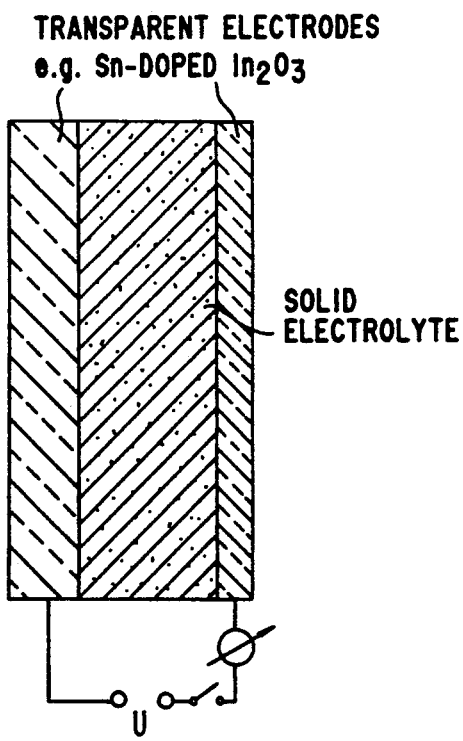
FIG. 2A shows the construction of a device according to the present invention in the case of use as a shadowable window.
Figure 2B:
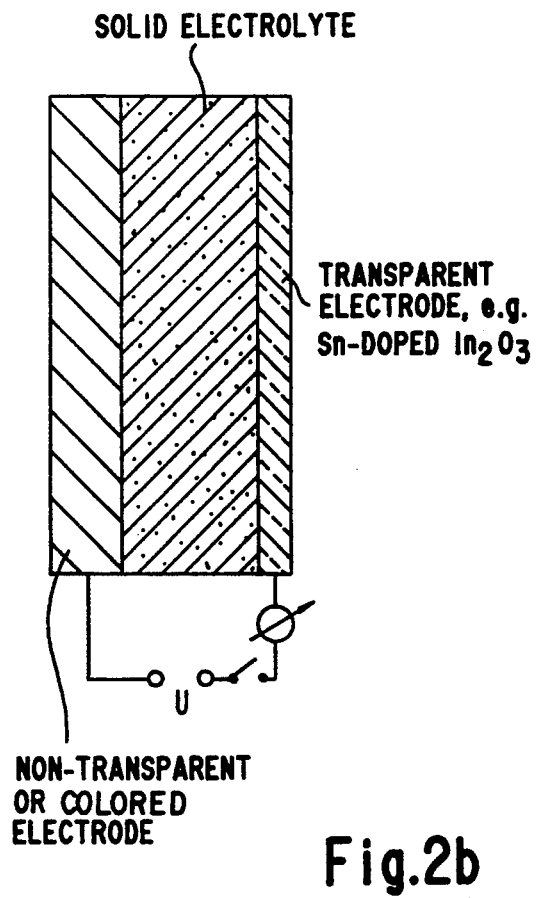
FIG. 2B shows such a device made as a shadowable mirror or display element.

A device is constructed which corresponds to the construction shown in FIG. 2A or 2B. The transparent electrodes consist of tin-doped indium oxide. As electrochromic material (mixed conductor) there is used titanium dioxide (rutile) which is doped with 0.1 to 2% of iron. This material displays, at an oxygen partial pressure of about $10^{-4}$ ats., a stoichiometric point at which the material has an electronic minimum and is transparent. By the application of a voltage of 1 V to this layer, which had been brought into equilibrium with oxygen partial pressure, one side is oxidised and the other reduced. The colour of the layer changes from blue to colourless. Switching off of the voltage again results in the disappearance of the colour change.

EXAMPLE 2

The construction of the electrochromic device corresponds to that shown in FIG. 5, an ion conductor component being used as electrochrome-active layer. For this purpose, as solid electrolyte there is used zirconium dioxide ($+10$ mole % yttrium oxide) which can exchange oxygen with the surroundings through the porous electrode. The surroundings thereby fixes the equilibrium oxygen partial pressure on this electrode side. The applied voltage then fixes a difference, referred thereto, of the chemical potential of the oxygen between the two electrodes. In the case of application of a voltage above about 1 V, starting from the non-porous electrode side, there is brought about a blackening. Also under blocking conditions on both sides, i.e., when there is no contact with a gas phase, the blackening manifests itself by application of the voltage. In the case of switching off of the voltage, the electrochrome-active material again becomes transparent.

I claim:

1. Electrochromic device which is especially suitable as a window, mirror or display element, characterized by a multi-layer construction with at least one layer, enclosed between two coated electrodes, of a material which is a member selected from a group consisting of (a) ionically-conductive material and (b) mixed ionically- and electronically-conductive material, whereby at least one of the two electrode layers consists of transparent material is at least transparent so long as no excitation takes place by the application of voltage via the electrodes.

2. The electrochromic device of claim 1, wherein the other electrode layer is a transparent material.

3. The electrochromic device of claim 1, wherein the other electrode is a non-transparent material.

4. The electrochromic device of claim 1, wherein the other electrode is of a reflective material.

5. Electrochromic device according to claim 1, wherein the conductive material is selected from the group consisting of titanium dioxide (rutile), zirconium dioxide with an addition of yttrium oxide, $Li_{2.3}Ti_{3.4}O_8$, $LiAl_5O_8$, $Li_5AlO_4$, $LiMnO_2$, $Li_2MnO_2$, $LiCoO_2$, $LiNiO_2$, $LiFeO_2$, $NaNiO_2$ and $NaCoO_2$ doped with 0.1 to 2% of iron.

6. An electrochromic device consisting essentially of, in a three-layer construction, a first electrode layer, a second electrode layer, and a middle layer therebetween, said first electrode layer being transparent, and said middle layer comprising a electrochromically active material that is a member selected from a group consisting of (a) ionically conductive material and (b) ionically and electronically conductive material, and that is transparent when no voltage is applied across said first and second electrode layers.

7. The electrochromic device according to claim 6, wherein the material of said middle layer is titanium dioxide (rutile), zirconium dioxide with an addition of a member selected from the group consisting of yttrium oxide, $Li_{2.3}Ti_{3.4}O_8$, $LiAl_5O_8$, $Li_5AlO_4$, $LiMnO_2$, $Li_2MnO_3$, $LiCoO_2$, $LiNiO_2$, $LiFeO_2$, $NaNiO_2$ and $NaCoO_2$ doped with 0.1 to 2% of iron.

8. The electrochromic device according to claim 6, wherein said first electrode layer is one of (a) porous and (b) perforated.

9. The electrochromic device according to claim 6, constructed as a mirror, wherein said second electrode layer consists of reflecting material.

10. The electrochromic device according to claim 6 constructed as a display, wherein said second electrode layer consists of colored, non-transparent material.

11. The electrochromic device according to claim 6, constructed as a protective window wherein said second electrode layer is transparent.

12. Electrochromic device according to claim 1, wherein one transparent electrode is one of (a) porous and (b) perforated.

13. Electrochromic device according to claim 1, constructed as a mirror, wherein the electrode lying on the side of device facing away from the observer consists of reflecting material.

14. Electrochromic device according to claim 1, constructed as a display, wherein the electrode lying on the side of device facing away from the observer consists of colored, non-transparent material.

15. A method of producing a protective coloring effect in a window comprising:
   providing a window constructed of an electrochromic device comprising, in a three-layer construction, a first electrode layer, a second electrode layer, and a middle layer therebetween, said first and second electrode layer being transparent, and said middle layer comprising a electrochromically active material that is a member selected from a group consisting of (a) ionically conductive material and (b) ionically and electronically conductive material, and that is transparent when no voltage is applied across said first and second electrodes, and
   applying an electrical voltage across said first and second electrode layers whereby a coloring of said middle layer is brought about.

16. A method of producing a shadowing effect in a mirror comprising:
   providing a mirror constructed of an electrochromic device comprising, in a three-layer construction, a first electrode layer, a second electrode layer, and a middle layer therebetween, said first electrode layer being transparent, said second electrode being reflective, and said middle layer comprising a electrochromically active material that is a member selected from a group consisting of (a) ionically conductive material and (b) ionically and electronically conductive material, and that is transparent when no voltage is applied across said first and second electrodes, and
   applying an electrical voltage across said first and second electrode layers whereby a coloring of said middle layer is brought about.

17. A method of covering over a display comprising: providing an electrochromic device comprising, in a three-layer construction, a first electrode layer, a second electrode layer, and a middle layer therebetween, said first electrode layer being transparent, said second electrode layer being non-transparent and formed as a display, and said middle layer comprising a electrochromically active material that is a member selected from a group consisting of (a) ionically conductive material and (b) ionically and electronically conductive material, and that is transparent when no voltage is applied across said first and second electrodes, and
   applying an electrical voltage across said first and second electrode layers whereby a coloring of said middle layer is brought about covering over said second electrode.

* * * * *